United States Patent
Daly

(10) Patent No.: US 7,424,166 B2
(45) Date of Patent: *Sep. 9, 2008

(54) ENHANCING THE QUALITY OF DECODED QUANTIZED IMAGES

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 836 days.

This patent is subject to a terminal disclaimer.

(21) Appl. No.: 10/746,518

(22) Filed: Dec. 24, 2003

(65) Prior Publication Data

US 2005/0141779 A1    Jun. 30, 2005

(51) Int. Cl.
*G06K 9/40*    (2006.01)
(52) U.S. Cl. ..................... 382/263; 382/275
(58) Field of Classification Search ......... 382/260–269, 382/274–275, 254; 358/1.9, 3.26, 3.27, 451; 345/598, 596; 348/607, 627; 359/291; 375/E7.027, 375/E7.139
See application file for complete search history.

(56) References Cited

U.S. PATENT DOCUMENTS

| | | | |
|---|---|---|---|
| 3,789,133 A * | 1/1974 | Kline | 348/627 |
| 4,020,462 A | 4/1977 | Morrin et al. | |
| 4,196,452 A | 4/1980 | Warren et al. | |
| 4,223,340 A | 9/1980 | Bingham et al. | |
| 4,268,864 A | 5/1981 | Green | |
| 4,399,461 A | 8/1983 | Powell | |
| 4,402,006 A | 8/1983 | Karlock | |
| 4,523,230 A | 6/1985 | Carlson et al. | |
| 4,536,796 A | 8/1985 | Harlan | |
| 4,549,212 A | 10/1985 | Bayer | |
| 4,553,165 A | 11/1985 | Bayer | |
| 4,937,677 A * | 6/1990 | van Dorsselaer | 358/451 |
| 4,962,426 A | 10/1990 | Naoi et al. | |
| 4,977,605 A | 12/1990 | Fardeau et al. | |
| 5,012,333 A * | 4/1991 | Lee et al. | 358/520 |
| 5,025,312 A | 6/1991 | Farourdja | |
| 5,218,649 A | 6/1993 | Kundu et al. | |
| 5,227,869 A | 7/1993 | Degawa | |
| 5,247,588 A * | 9/1993 | Komatsu | 382/263 |
| 5,260,791 A | 11/1993 | Lubin | |
| 5,389,978 A | 2/1995 | Jeong-Hun | |
| 5,526,446 A | 6/1996 | Adelson et al. | |
| 5,598,482 A * | 1/1997 | Balasubramanian et al. | 382/199 |
| 5,651,078 A * | 7/1997 | Chan | 382/261 |
| 5,696,852 A | 12/1997 | Minoura et al. | |
| 5,912,992 A | 6/1999 | Sawada et al. | |

(Continued)

FOREIGN PATENT DOCUMENTS

| | | |
|---|---|---|
| JP | 03102579 | 4/1991 |
| JP | 08009154 | 1/1996 |
| JP | 09261464 | 10/1997 |

OTHER PUBLICATIONS

Tilne Jarske, Petri Haavisto and Irek Defee, "Post-Filtering Methods for Reducing blocking Effects From coded Images," IEEE, Jun. 27, 1994.

*Primary Examiner*—Kanji Patel
(74) *Attorney, Agent, or Firm*—Chernoff, Vilhauer, McCLung & Stenzel, LLP

(57) ABSTRACT

A system for image enhancement and, more particularly, a system for enhancing the quality of a quantized image.

36 Claims, 5 Drawing Sheets

U.S. PATENT DOCUMENTS

| | | |
|---|---|---|
| 5,920,653 A | 7/1999 | Silverstein |
| 6,055,340 A | 4/2000 | Nagao et al. |
| 6,204,934 B1 * | 3/2001 | Minamino ................. 358/1.9 |
| 6,441,867 B1 * | 8/2002 | Daly ........................ 348/607 |
| 6,504,953 B1 | 1/2003 | Behrends |
| 6,674,904 B1 * | 1/2004 | McQueen .................. 382/199 |
| 6,751,006 B2 * | 6/2004 | Zhou et al. ................ 359/291 |
| 6,765,695 B2 * | 7/2004 | Chen et al. ................ 358/1.9 |
| 7,190,380 B2 * | 3/2007 | Damera-Venkata et al. . 345/698 |
| 7,268,790 B1 * | 9/2007 | Small et al. ............... 345/596 |

\* cited by examiner

ENHANCING THE QUALITY OF DECODED QUANTIZED IMAGES

BACKGROUND OF THE INVENTION

This invention relates to a system for image enhancement and, more particularly, to a system for enhancing the quality of a quantized image.

As the state of the art of digital signal technology advances, related technologies such as digital image processing has experienced a corresponding growth and benefit. For example, the development and proliferation of facsimile communications allows images to be encoded into digital signals, transmitted over conventional telephone line, and decoded into a close representation of the original images. Image data are also digitally encoded for ease of storage, modification, copying, etc. As is common experience with growing technologies, the field of digital image processing is also experiencing problems with applications in new areas.

Problems in the area of digital image processing relate generally to achieving a balance between acceptable image distortion and bit-depth representations. In order to increase the efficiency and therefore the usefulness of digital image decoding schemes, the coding system must provide a coded set of image data that is more efficient to store, transmit, etc., than the original image data and must reproduce a decoded image with some minimum level of quality. However, the conversion of relatively high bit rate image data to lower bit rate data virtually always entails a loss of image quality.

One straightforward method for digitizing an image is to create an artificial grid over the image and to assign a value to each grid space representing the color of the original image at that grid space. If the grids are made small enough and the values represent a large enough range of color, then the image may be encoded and decoded with small image quality degradation. For example, display screen images are made up of an array of pixels, i.e., picture elements. On a black and white screen, each pixel has a value of one or zero representing the on/off state of the pixel. In a one-to-one bit-to-pixel coding scheme, each pixel value is represented as a 1 or as a 0 and the entire screen image is encoded. The result of the encoding is an array of binary values. To decode the image, the array values are translated into a screen image having pixels on or off in the same order in which they were originally encoded.

If the image is comprised of more than two distinct colors, then more than a 1-bit code must be used to represent the pixel values. For example, if four distinct colors are present in the image, a 2-bit binary code can represent all of the values. If the image includes 256 distinct colors, an 8-bit binary code is required to uniquely represent each of the color values. The memory requirements for such coding schemes increase as the number of distinct colors in the image increases. However, with high bit-depth representation schemes, the quality of the image that results will be good as long as the digital image transmission or recovery from storage is successful.

To reduce the size of the encoded digital image, the bit-depth representation of the image may be reduced in some manner. For example, an image with a bit-depth of 6 bits per pixel requires significantly less storage capacity and bandwidth for transmission than the same sized image with 16 bits per pixel.

Decoded images, constructed by a low bit-depth representation, generally suffer from the following types of degradation: (a) quasi-constant or slowly varying regions suffer from contouring effects and amplified granular noise, and (b) textured regions lose detail.

Contouring effects, which are the result of spatial variations, in a decoded image are generally fairly obvious to the naked eye. The contouring effects that appear in the slowly varying regions are also caused by the fact that not all of the variations in the intensity of the original image are available for the decoded image. For example, if a region of the original image included an area having 4 intensity changes therein, the decoded image might represent the area with only 2 intensities. In contrast to the contouring effects, the effect of the granular noise on the viewed image is often mitigated by the very nature of the textured regions. But it can be both amplified or suppressed due to quantization, as well as altered in spectral appearance.

Kundu et al., U.S. Pat. No. 5,218,649, disclose an image processing technique that enhances images by reducing contouring effects. The enhancement system identifies the edge and non-edge regions in the decoded image. Different filters are applied to each of these regions and then they are combined together. A low pass filter (LPF) is used on the non-edge regions, and a high-pass enhancer is used on the edge regions. Kundu et al. teaches that the contour artifacts are most visible in the non-edge areas, and the LPF will remove these edges. Unfortunately, problems arise in properly identifying the edge regions (is a steep slope an edge or a non-edge?). In addition, problems arise in setting thresholds in the segmentation process because if the contours have a high enough amplitude, then they will be classified as edges in the segmentation, and thus not filtered out. Moreover, the image segmentation requires a switch, or if statement, and two full-size image buffers to store the edge map and smooth map, because the size of these regions varies from image to image, all of which is expensive and computationally intensive.

Chan, U.S. Pat. No. 5,651,078, discloses a system that reduces the contouring in images reproduced from compressed video signals. Chan teaches that some contours result from discrete cosine transformation (DCT) compression, which are more commonly called blocking artifacts. Chan observes that this problem is most noticeable in the dark regions of image and as a result adds noise to certain DCT coefficients when the block's DC term is low (corresponding to a dark area). The resulting noise masks the contour artifacts, however, the dark areas become noisier as a result. The dark areas thus have a noise similar to film-grain-like noise which may be preferable to the blocking artifacts.

What is desirable is a system for reducing contouring effects of an image. Because the system does not necessarily affect the encoding or transmission processes, it can be readily integrated into established systems.

DETAILED DESCRIPTION OF THE PREFERRED EMBODIMENT

Figure 1:
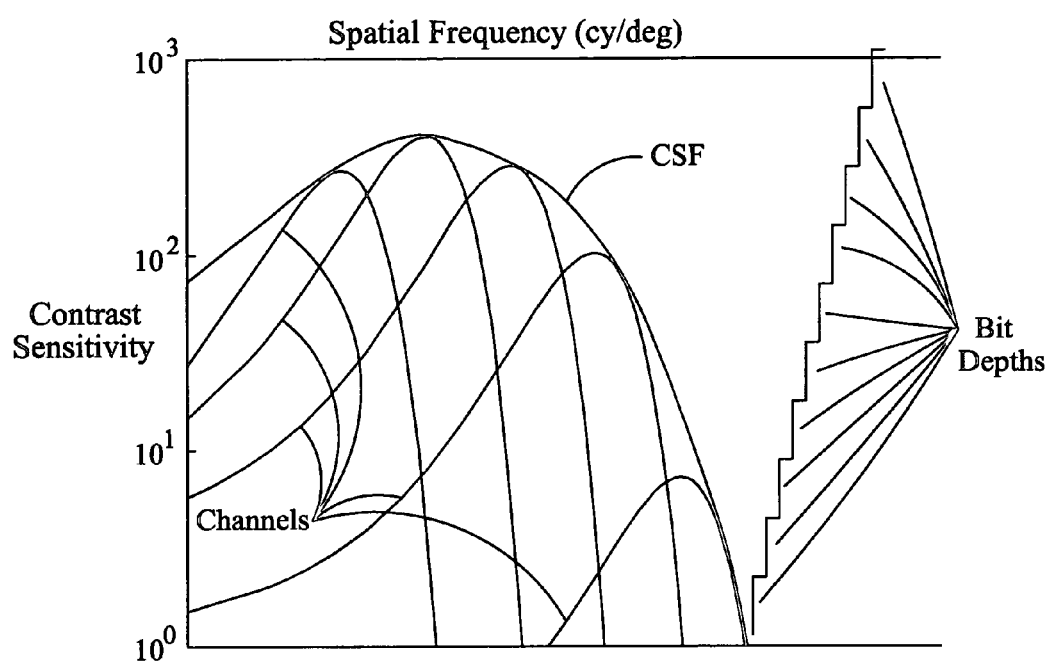
FIG. 1 illustrates a contrast sensitivity function.

The present inventor observed that the many of the objectionable contouring effects in images appear in regions of the image that are generally free from a significant number of edges or otherwise high texture. The present inventor similarly observed fewer objectionable contouring effects in regions of the image that have a significant number of edges or otherwise high texture. After consideration of this difference in observing objectionable contouring effects, the present inventor considered that the human visual system has lower sensitivity to these contour effects in the high frequency regions of the image and the human visual system has higher sensitivity to these contour effects in the low frequency regions of the image. FIG. 1 depicts the overall spatial response of the human visual system with its underlying visual channels with the coarse quantization below the threshold. Further, the masking effects by the higher frequency content of the image, which is limited to the channels as shown in FIG. 1, further inhibits the visibility of the steps in the waveforms in the high frequency regions of the image.

In order to preserve the quality of the image, the system preferably (albeit not necessary) reduces the effects of the objectionable contours without having to add noise to the image in order to hide them. Thus the system is suitable for use with images that are otherwise free of image capture noise, such as computer graphics and line art with gradients. Moreover, it would be preferable (albeit not necessary) that the technique is implemented without decision steps or if statements to achieve computational efficiency. Also, the technique should require not more than a single buffer of a size less than or equal to the image, and more preferable a buffer less than 30, 20, or 10 percent of the size of the image.

Figure 2:
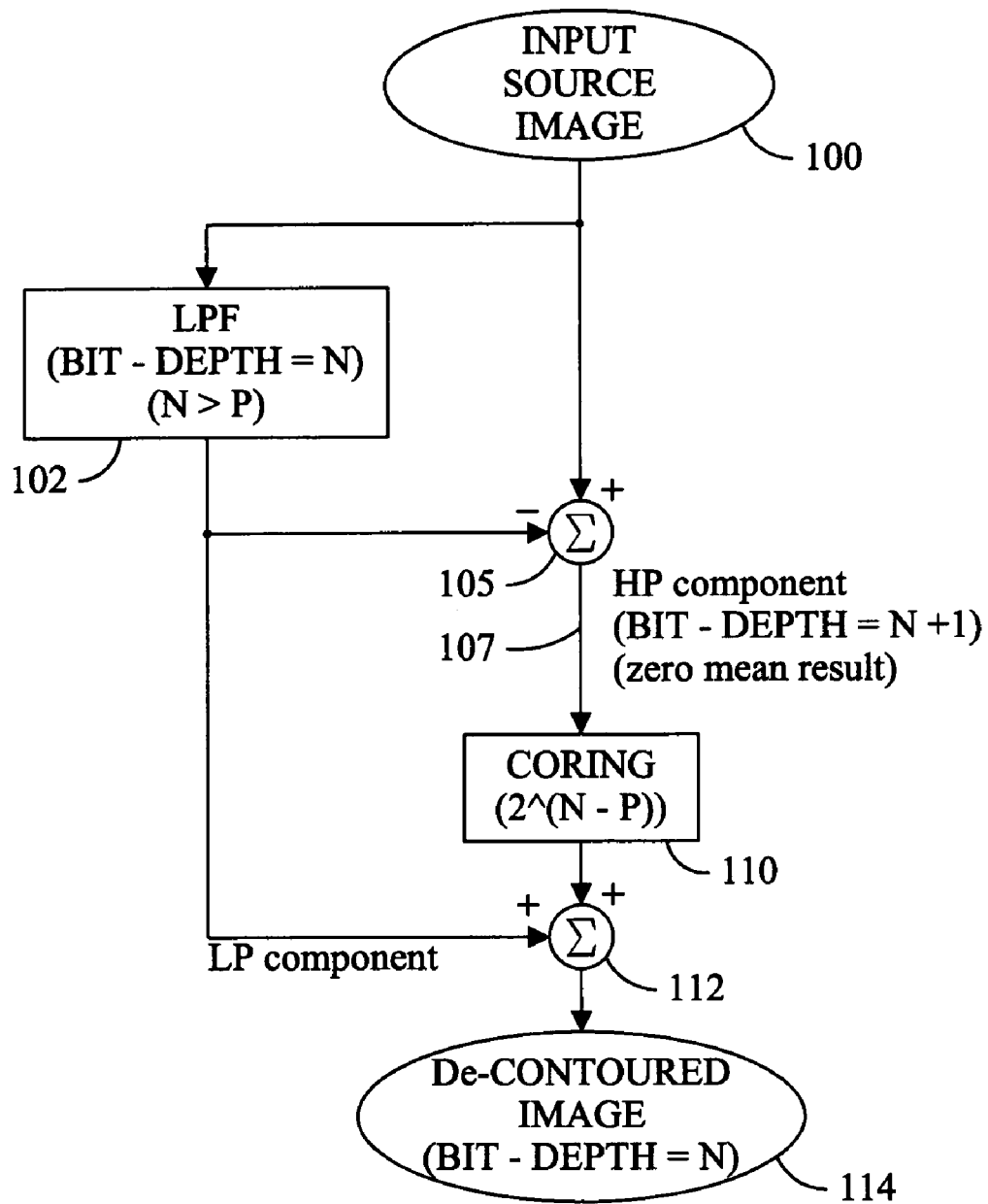
FIG. 2 illustrates an image processing technique.

Referring to FIG. 2, an input image 100 is provided with bit-depth P. The bit-depth P is frequently 8-bits for many images. As previously described, the image with a bit depth of P is normally quantized into $2^P$ different values but may exhibit contouring effects when displayed on a display with a different bit depth, such as a 10 bit display. In order to reduce those aspects of the image that are likely to exhibit contouring effects the present inventor came to the realization that the aspects of the image that will create contouring effects should be identified in a suitable manner. In another case, the image may be represented as P bits, but actually have quantization artifacts due to less than P bits. An example is a DVD image which is represented at 8 bits/color but only has 6 bits/color of real information because of the quantization of P or B-frames, or in the YCbCr to RGB conversion. In many cases, such as DVD applications, the bit-depth limitation comes from the inaccurate color matrix calculation (e.g., insufficient bit-depth in the registers).

To reduce the false step edges of contouring the image is preferably low-pass filtered 102. The low-pass filter applied to the image also acts to increase the bit depth, since the low pass filter is primarily an averaging operation (averaging across a neighborhood of pixels), and the averaging results in a higher precision. Other techniques may likewise be applied to effectively modify the bit depth of the image. In some cases, the system may also modify the bit depth by switching the number of bits used for processing the image, such as 8 bits to 16 bits. One way of characterizing an increase in the bit depth of an image is to modify in any manner an image to $2^N$ different levels, where N≠P. Alternatively, the image may already have a bit-depth needed/desired for the output (P=N), but the image itself may have a limited bit depth of P (P<N) from a previous operation. In this case, the value of P should be known or otherwise determined. Alternatively, the image may have a bit-depth of N, but the image itself may have a limited bit-depth of P (P<N).

The result of the low pass filtering of the image is to modify the image to achieve a bit depth of N. In most cases the bit depth N is the desired bit depth in the final image, such as an image having bit depth N to be displayed on a N bit display. The low pass filter should be sufficiently wide (in the spatial domain) to reduce most false steps (contouring) due to the bit-depth limit P. It is noted that the low pass filter likewise reduces other desirable image information within the image, so merely low-pass filtering the image is insufficient. Note that the low pass filter also reduces much useful image information, such as by severely blurring the image, so this step is insufficient to properly rectify the undesirable contouring.

The low pass filter 102 may be implemented as Cartesian-separable 1-dimensional filters. The use of a pair of 1-dimensional filters is more computationally efficient than a 2-dimensional filter. The filter preferably has a rectangular shape. The size of the low pass filter kernel may be based upon the viewing distance and the pixels per inch of the display. For a 90 pixel per inch display viewed at 1000 pixel viewing distance, the kernel size should be more than 11 pixels to remove the visibility of a contour edge, but the present inventor determined that the kernel size should actually be more than 31 pixels to remove the low frequency modulation component of the false contour. Accordingly, the kernel size should be based upon the low frequency modulation component of the false contour, as opposed to merely the visibility of the contour edge.

The resulting image from the low pass filter is primarily the low frequency components of the image. It is likewise to be understood that any suitable filter may be used, such as one that generally attenuates the high frequency components with respect to the low frequency components of the image.

The system may subtract 105 the low pass filtered image 102 from the original bit-depth limited image 100 having false contours. This in essence reduces the low-frequency content of the input image, while primarily leaving the high frequency content. However, the subtraction 105 also results in another attribute, namely, the high frequency portion of the remaining image contains the high frequency portion of the contour artifacts. The result of this operation may be referred to as the HP component 107. It is also noted that the result of the low pass filter 102 is that the low frequency portion of the remaining image from low pass filter 102 contains the low frequency portion of the contour artifacts. Accordingly, the contouring artifacts are separated in some manner between the low frequency and high frequency components of the image. One manner of separating the contouring artifacts is if the low pass filter kernel is less than the spacing of the contour, then the low pass component is considered to contain no contouring components.

The subtraction process 105 leads to a bit-depth increase of 1 due to the sign. For example a subtraction of two images with 0 to +255 results in an image with a range from −255 to +255. Hence the high pass component 107 has N+1 bit depth (this is based upon a source image being padded to N bits before the subtraction operation). Padding may include inserting 0's and/or 1's to the least significant bits that are missing from the lower bit depth representations relative to the higher.

It is noted that the output of the system may not need N+1 bits, but it should be able to carry a sign, and thus have a zero mean level. If only N bits are used and one bit is dedicated to the sign, then only N−1 bits are available for addition to the low pass filter image (in the last addition step). In that case some edge sharpness and detail may be lost.

As previously described, the result of subtracting the low pass filtered image from the original image results in an image that maintains high frequency false contour information. It has been determined that the high frequency false contour information that should be reduced are those having a low amplitude. Accordingly, the low amplitude information should be reduced with respect to the high amplitude information. To reduce the low amplitude high frequency false contour information a coring function 110 may be applied. The coring function 110 may include a hard-threshold coring function, such as for example, if abs(HP)<b then HP=0, else HP=HP. This effectively reduces the contours, especially if the low pass filter is sufficiently large.

Unfortunately, simply applying a hard-threshold coring function, while acceptable, resulted in unexpected additional artifacts that appear like islands of color, and as ringing of step edges. After consideration of these unexpected artifacts, it was determined that a transitioned coring function will both reduce the low amplitude high frequency false contour information, and reduce the additional color islands and ringing of steps edges. A modified transitional coring function, may be for example, as:

$$CVout=sign(CVin)*A[0.5-0.5\cos(\alpha|CVin|)] \text{ for } |CVin|<M \quad (1)$$

$$CVout=CVin \text{ for } |CVin|\geq M$$

CVin is the input code value of the HP image to the coring function, while CVout is the output code value of the coring function. M is the merge point that is where the coring behavior ends (or substantially ends) and the coring function returns to the identify function (or other suitable function). A and α are parameters selected to ensure two conditions at the merge point, M, namely:

(A) amplitude=M
(B) slope=1

The first criterion ensures that the coring function has no discontinuity in actual value, and the second ensures that the $1^{st}$ derivative is continuous. The first criterion keeps the tone scale monotonic in the HP band, and the second avoids mach band type artifacts. Thus this coring function could even be applied to the low pass band without such artifacts. It is noted that the coring function preferably has a slope that equals 1 that intersects with the origin of the plot as well as no second order discontinuities.

The criteria may be restated as follows:

$$M=A[0.5-0.5\cos(\alpha M)] \text{ for the amplitude} \quad (2)$$

$$1=d/dCVin(A[0.5-0.5\cos(\alpha CVin)])|CVin=M \quad (3)$$

Figure 3:
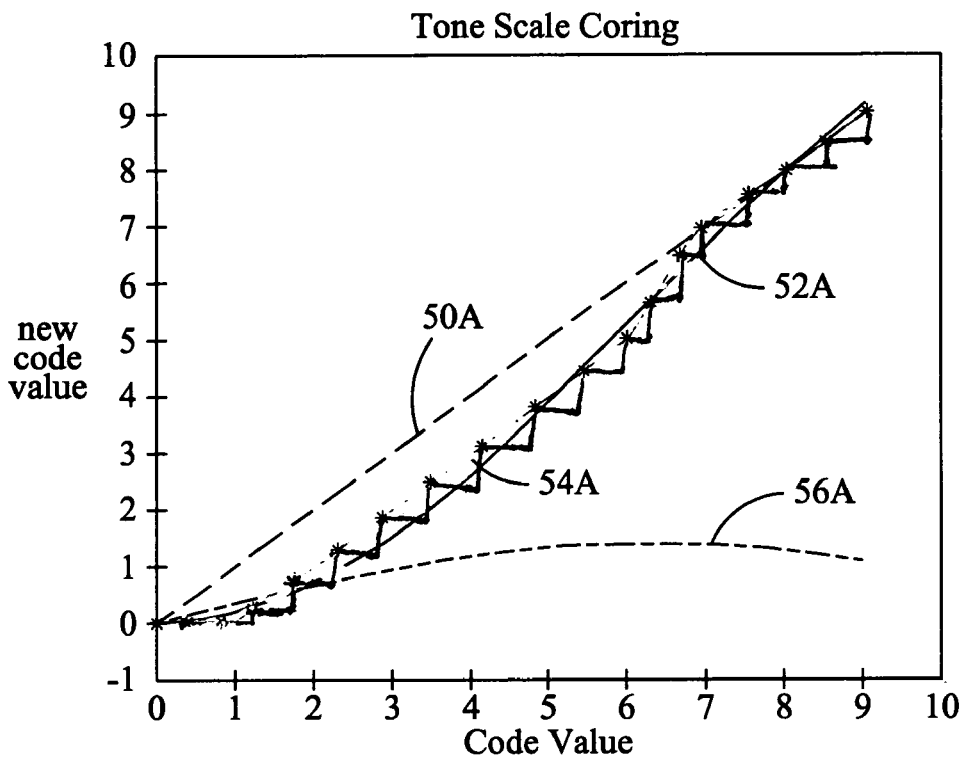
FIG. 3 illustrates a de-contouring functions.

An example of the coring functions for the value of M=8 with A=11.3 and α=0.25, is shown in FIG. 3 to illustrate the actual mapping due to the effects of the quantization to N bits. Curve 50 has a slope equal to 1. The curve 52 is equation (1) with the parameters to achieve a merge point at 8. The curve 54 are the actual code values if the HP image is quantized to N bits. The curve 56 is the slope of the scaled cosine function in equation (1), before the merge point. It is noted that only the positive half of CVin is illustrated.

Figure 4:
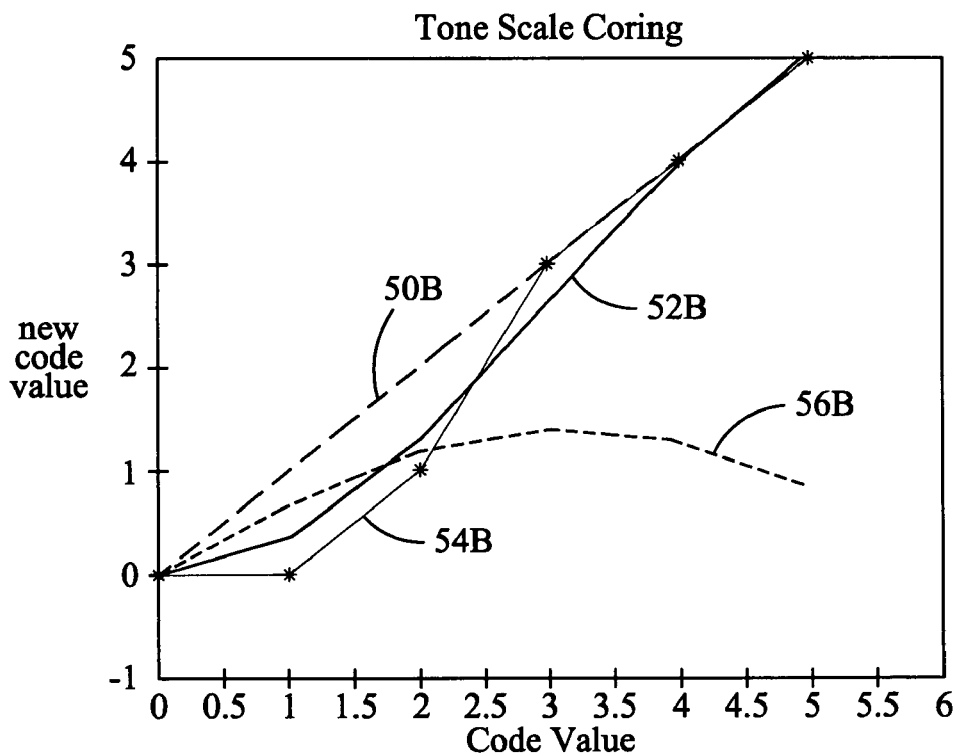
FIG. 4 illustrates another de-contouring function.
Figure 5:
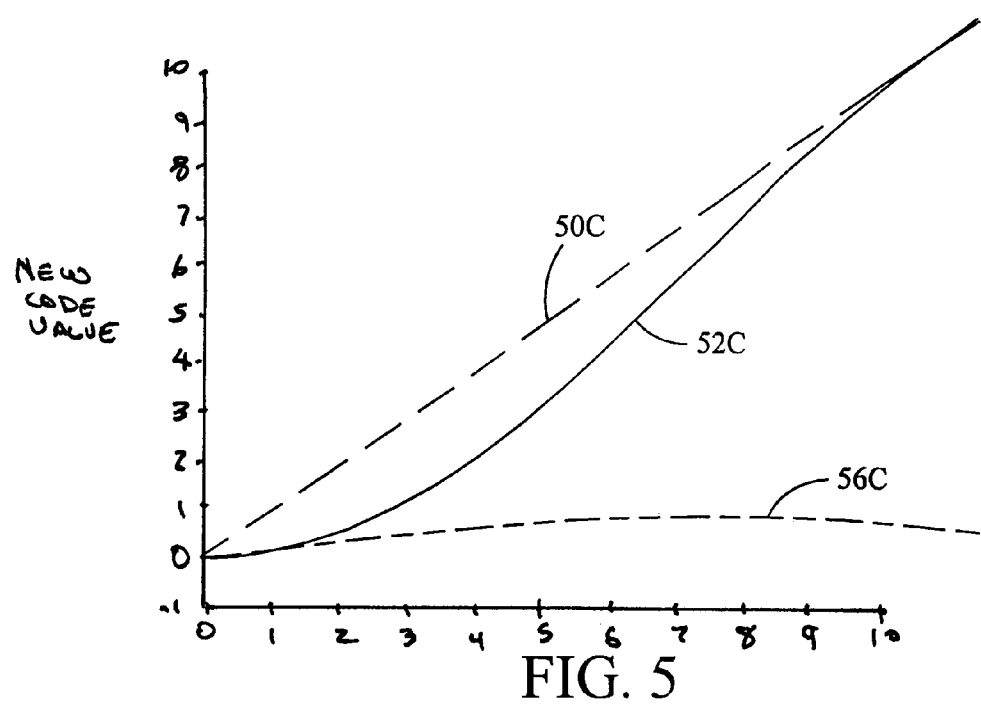
FIG. 5 illustrates yet another de-contouring function.

Another example of the coring function for the value of M=4 with A=5.6 and α=0.5 is illustrated in FIG. 4. Another example of the coring function for the value of M=16 with A=19.75 and α=0.14 is illustrated in FIG. 5.

Referring again to FIG. 2, the next step is to add the cored image 110 and the filtered low pass components 102 together at 112. This operation restores the low frequency information that was reduced back to the image. The result of this addition operation is N+1 bits. It is N+1 since the range may be larger than the input image (for example if the low pass component for N bits may be 0 to +255, the high pass component may have a range of N+1 (−255 to +255) and the result is −255 to +512). Anything out of the range of N bits is clipped (e.g., out of range 0 to +255 for N=8). It turns out that there are a limited number of pixels that fall out of that range, and when they do, they are usually isolated edge pixels. The clipping that occurs as a result is not readily visible in the final image 114.

The number of gray levels is given by N or P, which are bit-depths, so the numbers of levels is $2^N$ or $2^P$. However, another embodiment is to not use bit-depth to determine the number of gray levels, but the numbers of gray levels directly.

In a particular implementation, each of the steps shown in FIG. 2 may be applied to the entire image in a sequential manner, which may result in the need for large buffers. However, a more memory efficient technique involves using as a sliding window, where the computations within the window are used to compute the pixel at the center of the window (or in some other position in the window). This reduces the memory requirements.

In a typical implementation the bit-depth of the input and output images are known in advance. This is typically the case in many applications, such as display an eight bit image on a 10-bit display.

While the implementation illustrated in FIG. 2 effective reduces the contour artifacts, it was determined that it also removes a significant amount of low amplitude detail. While such a result is satisfactory for most cases because the viewer is unaware of exactly how the image should really appear, it turns out to be particularly detrimental in the facial region of an image, where there is a higher expectation of the appropriate texture by the typical viewer.

To reduce the loss of low amplitude texture details, the present inventors came to the realization that one may separate the case where the low amplitude information is due to the image texture (which is generally isotropic) versus the case when the low amplitude information is due to a false contour (which is generally non-isotropic, a.k.a., structured error). Generally, isotropic information ("iso" meaning one or the same, and "tropic" meaning space or direction) has the same texture in all directions. For example, clean sand on the beach may be considered generally isotropic. For example, generally non-isotropic information has different textures in different directions. In many cases, the non-isotopic information has the characteristic of an edge. Accordingly, generally isotropic information has more uniform texture relative to generally non-isotropic information.

While a plurality of different filters may be used, it is preferable to use a single filter, which is more computationally efficient in many cases. The accumulation of local special activity may be determined in a suitable manner, such as for example, a single sigma type filter or a single sum of absolute differences (SAD) type filter.

The preferred system uses a version where the lowpass filter is implemented in two Cartesian separable steps (i.e., a cascade of H and V steps.), and the filter width spatially is =31 pixels, with a uniform impulse response. For many images a filter width of 17 or 25 is acceptable. Typically a width less than 17 does not work exceptionally well for ppi>90.

Figure 6:
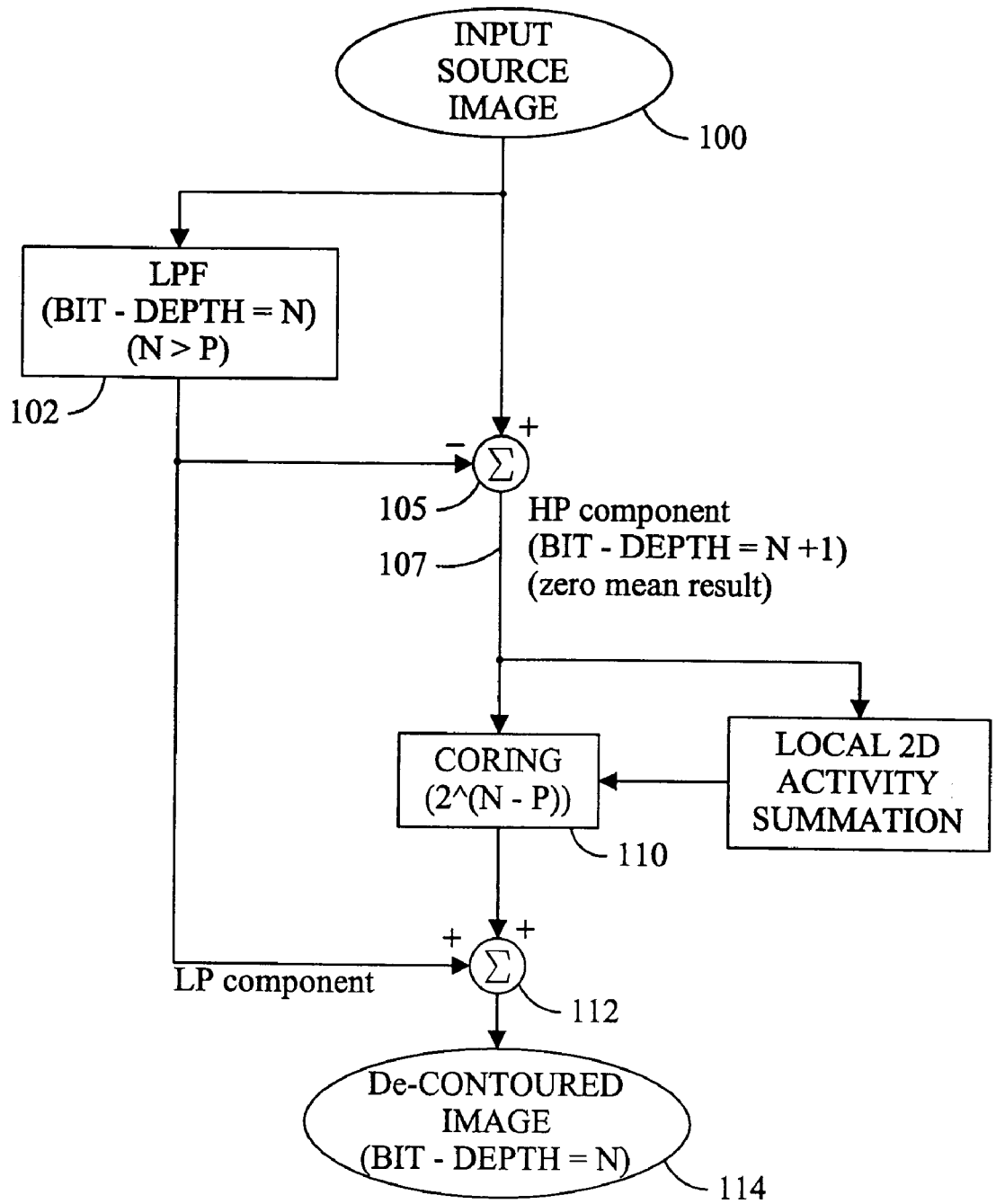
FIG. 6 illustrates a modified image processing technique.

Referring to FIG. 6, the system may accumulate local activity over a local region around a pixel of the image to be cored (examples include standard deviation, α, over a local 9×9 window, sum of absolute differences, SAD, over a similar local window). One may select different coring functions based on a local activity index (or continuously adjust coring function based on a local activity index). Local activity measure could be taken from the mean of the local window, but is more preferably around the zero activity point of the HP image (i.e., 0, unless a pedestal offset is used.).

The invention claimed is:

1. A method for modifying an image comprising:
 (a) receiving an image having a first bit depth;
 (b) modifying said image with a low pass filter to create a first modified image resulting in a second bit depth different than said first bit depth in such a manner that the higher frequency content with respect to the lower frequency content of said modified image is attenuated, said low pass filter being a Cartesian-separable 1-dimensional filter having a filter kernel size based on the resolution of a display showing said image and a viewing distance to said display;

(c) modifying said image to create a second modified image based upon said first modified image in such a manner to reduce lower frequency content of said image;

(d) modifying said second modified image to create a third modified image in such a manner to attenuate low amplitude content with respect to high amplitude content of said second modified image;

(e) modifying said third modified image based upon said first modified image to increase the amount of low frequency content of said third modified image.

2. The method of claim 1 wherein said received image of step (a) is represented by X bit depth.

3. The method of claim 2 wherein said first modified image of step (b) is represented by Y bit depth.

4. The method of claim 3 wherein X>Y.

5. The method of claim 1 wherein said modifying of step (b) is a low pass filter.

6. The method of claim 1 wherein said modifying of step (b) wherein said lower frequency content is amplified.

7. The method of claim 1 wherein said modifying of step (b) changes the physical bit depth representation of the image.

8. The method of claim 1 wherein said modifying of step (b) does not change the physical bit depth representation of the image.

9. The method of claim 1 being performed in a manner free from including conditional statements.

10. The method of claim 1 being performed in a manner using a buffer smaller than 100 percent of said received image.

11. The method of claim 1 being performed in a manner using a buffer smaller than 30 percent of said received image.

12. The method of claim 1 being performed in a manner that is free from adding additional noise to said image.

13. The method of claim 1 being performed in a manner based upon the human visual system.

14. The method of claim 1 wherein step (d) including coring of said image.

15. The method of claim 14 wherein said coring is adaptive.

16. The method of claim 14 wherein said coring attenuates non-isotropic content to a greater extent than isotropic content.

17. A method for modifying an image having a first bit depth to an image having a second bit depth, wherein said second bit depth is greater than said first bit depth comprising:

(a) receiving an image having said first bit depth;

(b) processing said image in a manner increasing the bit depth of said image to said second bit depth;

(c) modifying said image to create a modified image based upon said increased bit depth image in such a manner to reduce lower frequency content of said image;

(d) modifying said modified image to create another image in such a manner to attenuate low amplitude content with respect to high amplitude content of said modified image;

(e) modifying said another image based upon said increased bit depth image to increase the amount of low frequency content of said another image.

18. The method of claim 17 wherein said processing includes modifying said image resulting in a second bit depth different than a first bit depth of said received image in such a manner that the higher frequency content with respect to the lower frequency content of said modified image is attenuated.

19. The method of claim 17 wherein said processing of step (b) is a low pass filter.

20. The method of claim 17 wherein said processing of step (b) changes the physical bit depth representation of the image.

21. The method of claim 17 wherein said modifying of step (b) does not change the physical bit depth representation of the image.

22. The method of claim 17 being performed in a manner free from including conditional statements.

23. The method of claim 17 being performed in a manner using a buffer smaller than 100 percent of said received image.

24. The method of claim 17 being performed in a manner using a buffer smaller than 30 percent of said received image.

25. The method of claim 17 being performed in a manner that is free from adding additional noise to said image.

26. The method of claim 17 being performed in a manner based upon the human visual system.

27. The method of claim 17 wherein said image having said first bit depth has been previously quantized to a lesser bit depth.

28. The method of claim 27 wherein said increased bit depth is represented within an image using the same number of bits per pixel of said image as said first bit depth.

29. The method of claim 17 wherein step (d) including coring of said image.

30. The method of claim 17 wherein said coring is adaptive.

31. The method of claim 17 wherein said coring attenuates non-isotropic content to a greater extent than isotropic content.

32. A method for modifying an image having a first bit depth to an image having a second bit depth, wherein said second bit depth is greater than said first bit depth comprising:

(a) receiving an image having said first bit depth;

(b) processing said image using a low pass filter to result in a processed image having at least a bit depth as large as said second bit depth;

(c) modifying said image to create a modified image based upon said processed image in such a manner to reduce lower frequency content of said image;

d) modifying said modified image to create another image in such a manner to attenuate low amplitude content with respect to high amplitude content of said modified image;

(e) modifying said another image based upon said processed image to increase the amount of low frequency content of said another image.

33. A method for modifying an image having a first bit depth to an image having a second bit depth, wherein said second bit depth is greater than said first bit depth comprising:

(a) receiving an image with said first bit depth having the characteristic that contouring results when said image is presented with said second bit depth;

(b) processing said image using a low pass filter to result in a processed image having at bit depth at least as great as said second bit depth;

(c) modifying said image to create a modified image based upon said processed image in such a manner to reduce lower frequency content of said image;

(d) modifying said modified image to create another image in such a manner to attenuate low amplitude content with respect to high frequency content of said modified image;

(e) modifying said another image based upon said processed image to increase the amount of low frequency content of said another image.

34. The method of claim 33 wherein said processed image has said second bit depth.

35. The method of claim 33 wherein said processed image has a bit depth greater than said second bit depth.

36. A method for modifying an image having a first bit depth to an image having a second bit depth, wherein said second bit depth is greater than said first bit depth comprising:

(a) receiving an image with said first bit depth having the characteristic that contouring results when said image is presented with said second bit depth;

(b) processing said image using a low pass filter to result in a processed image having at bit depth at least as great as said second bit depth;

(c) modifying said image to create a modified image based upon subtracting said processed image from said image in such a manner to reduce lower frequency content of said image;

(d) modifying said modified image to create another image in such a manner to attenuate low amplitude content of said modified image while free from substantially attenuating high amplitude content of said image;

(e) modifying said another image based upon adding said processed image to said another image to increase the amount of low frequency content of said another image resulting in an image having said second bit depth.

* * * * *